Dec. 21, 1965  O. H. ALLMAN ETAL  3,224,857
APPARATUS FOR HOMOGENIZING MOLTEN GLASS IN A FOREHEARTH
Filed Aug. 18, 1960  3 Sheets-Sheet 1

INVENTORS
ORIN H. ALLMAN
CARL E. BAUMAN
BY LESLIE F. PITHER
H. A. Schaich &
E. J. Holler
ATTORNEYS

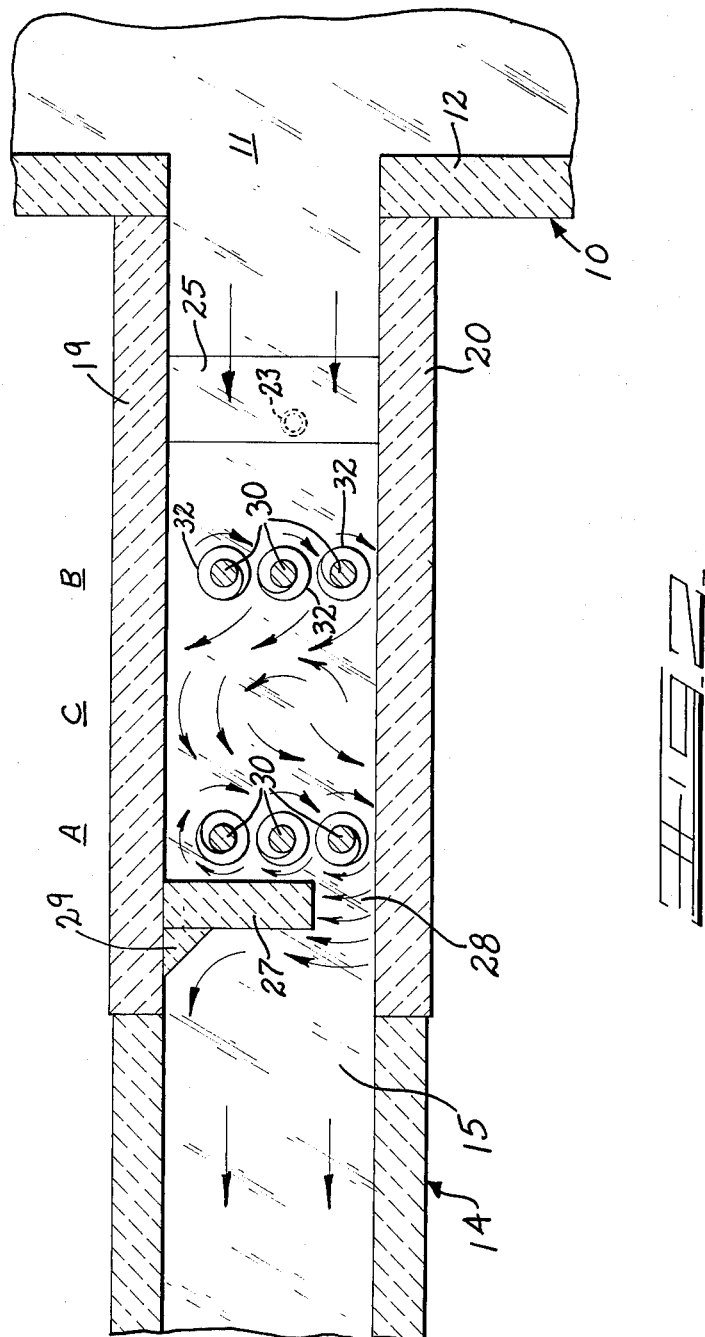

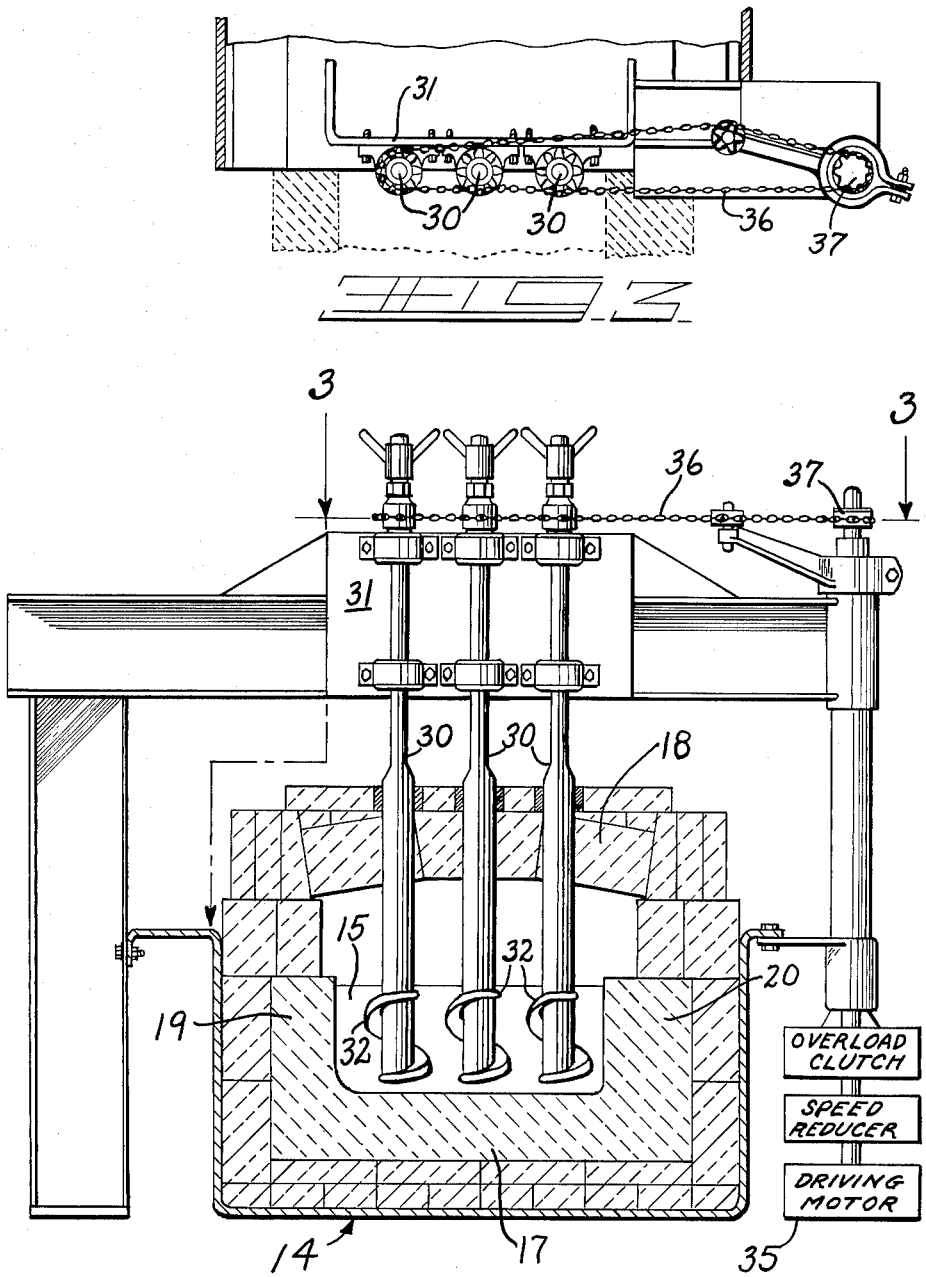

3,224,857
APPARATUS FOR HOMOGENIZING MOLTEN
GLASS IN A FOREHEARTH
Orin H. Allman and Carl E. Brumm, Toledo, and Leslie
F. Pither, Maumee, Ohio, assignors, by mesne assignments, to Owens-Illinois Glass Company, Toledo, Ohio, a corporation of Ohio
Filed Aug. 18, 1960, Ser. No. 50,365
4 Claims. (Cl. 65—178)

This invention relates broadly to improvements in methods and apparatus for homogenizing molten glass in glass feeder forehearth or other container for molten glass. In addition and more specifically, the invention relates to the manufacture of colored glass and particularly to method and means for mixing coloring materials with the molten glass prior to its delivery at a point of use. The invention is of particular utility in connection with continuous-type glass melting and refining furnaces in which the molten glass flows from the melting and refining tank into a forehearth from which the glass is dispensed.

Molten glass during its conveyance through a forehearth frequently tends to become non-uniform in temperature and non-homogenous in character due to portions of the glass stream adjacent and in contact with the forehearth bottom and side walls tending to be cooler and more viscous than the central portion of the glass stream. The central portion is usually hotter and less viscous in nature which flows more rapidly than the cooler, more viscous marginal portions of the complete stream or body of glass. Also temperature and viscosity differences frequently exist between longitudinal portions of the complete stream or body of glass extending through the length of the forehearth. Individual portions of the glass stream or body disposed longitudinally of the forehearth may be of different composition due to contaminants which may be introduced into the glass from the walls of the forehearth. Thus, thin streaks, cords or stria may exist in the glass due to such contamination and differences in temperatures and viscosities which can and do occur within the mass of glass. As a result thereof, the stream of glass which is delivered to a glass feeder may be of low quality or intermittently defective making the product unsuitable for its intended use or causing a high rejection rate in forming glass block, containers, or other glassware, for example.

In the manufacture of colored glass it is known art to feed coloring materials into the molten glass stream as the latter flows from the refining tank into the forehearth. The colorant material intermingles with the molten glass and is melted thereby and may then be further mixed with the glass in the forehearth by stirring devices. The addition of the coloring material commonly results in the colorant which is added at the surface of the flowing glass tending to flow in cords or "color streaks" along the bottom and side surfaces of the forehearth without being uniformly mixed throughout the body of glass.

One such form of stirring device to obtain improved top-to-bottom and bottom-to-top stirring of the glass is illustrated in U.S. Patent No. 2,817,191 to Hamilton, issued December 24, 1957, entitled "Furnace for the Manufacture of Colored Glass," which is assigned to the same parent assignee as the present application. However, the aforementioned prior art stirring mechanisms and methods have been incapable of homogenizing molten glass or properly intermixing colorant materials into molten glass at high rates of pull for an individual forehearth.

The elimination of cords and streaks and equilization of temperature and viscosity throughout the glass in the outlet region of the forehearth at appreciable delivery rates are problems of long standing in the glass feeding and coloring art. Many forms of stirrers and other homogenizing implements have been utilized in the forehearth to rectify the aforementioned defects but the results heretofore obtainable have not been fully satisfactory, particularly at high rates of pull as high as 50 tons per day.

Accordingly, it is an object of the present invention to provide novel method and apparatus for glass stirring within the forehearth to produce a molten glass product which is uniformly homogenized and uniformly colored where a colorant is uniformly mixed throughout the body of flowing glass, the homogenous glass being of uniform color throughout and free from streaks or cords.

Another object of the present invention is to provide improved method and apparatus for homogenizing molten glass during its conveyance to a point of use at high delivery rates without introducing seeds or blisters thereinto.

Another object of the present invention is to provide an effective and unique arrangement of glass stirring and impelling means adapted to impart circulatory and upward movement of the glass in one region and secondary circulatory movement in the reverse direction in another region to eliminate cords or stria in transparent molten glass or nonuniformity of color in colored glass.

A further object of the invention is the provision of glass stirring and impelling means and stationary diverting elements to subject the complete glass stream to severe shearing stresses in at least one localized region of circulatory movement during its travel in the direction of normal stream flow and through a restricted passage after subjection to such shearing stresses.

A still further object of the present invention is to eliminate stratification and effect thorough mixing and blending of different strata and inhomogeneous portions of a molten glass stream at a predetermined region of a forehearth channel following introduction of a colorant material to provide substantial uniformity of temperature, viscosity and color of the entire mass of glass for its delivery at a point of use.

Other objects and advantages of the invention hereinafter described in detail will be pointed out or will become apparent from the following description of a practical embodiment of the invention shown in the accompanying drawings in which:

FIG. 2 is a horizontal sectional view taken along the line 2—2 of FIG. 1 with the stirring and impelling means of the present invention shown in plan;

FIG. 3 is a fragmentary plan view taken along the line 3—3 of FIG. 4 showing the stirring elements and driving mechanism; and FIG. 4 is a transverse vertical sectional view of an individual series of stirring elements showing the stirrer driving mechanism.

Figure 1:
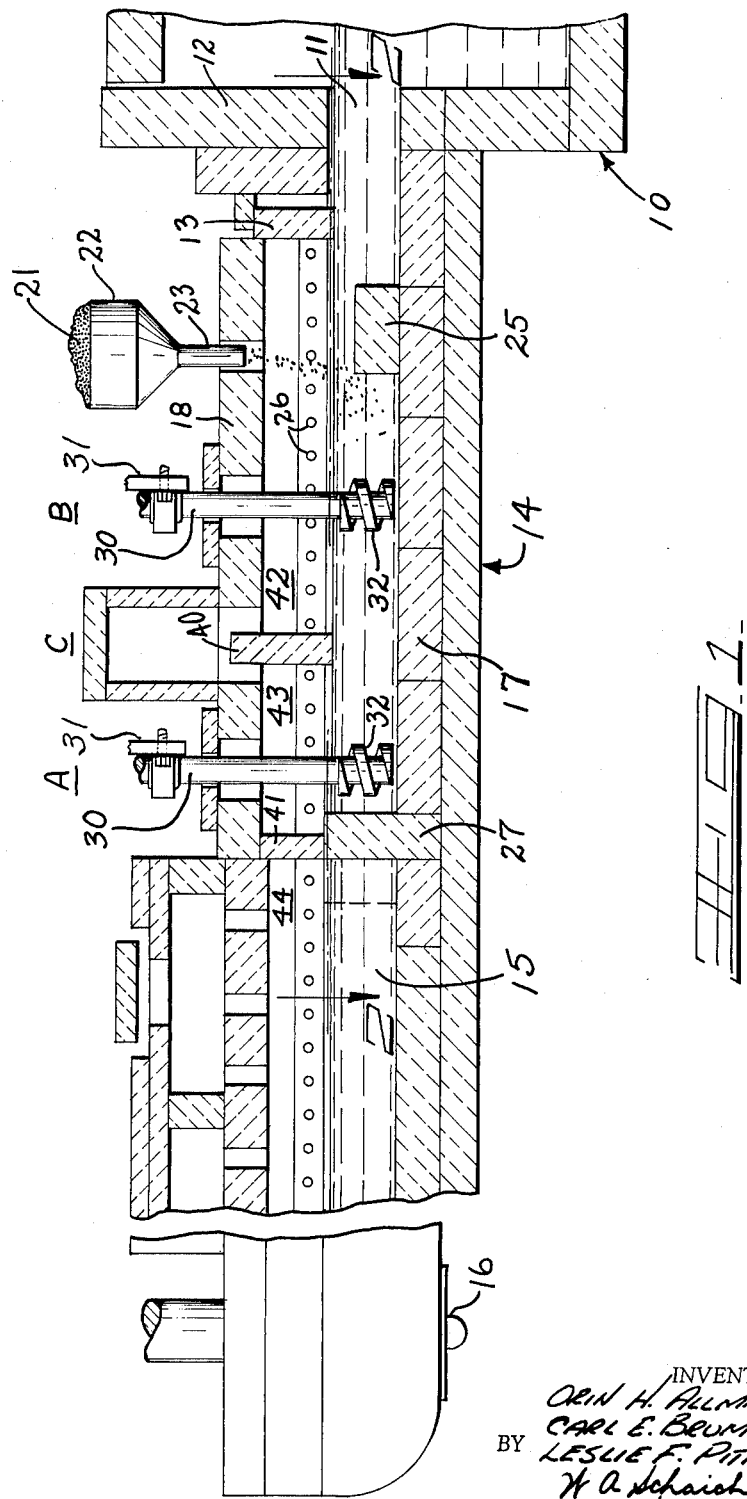
FIG. 1 is a longitudinal sectional elevation of a furnace tank and forehearth, the latter being equipped with one form of molten glass stirring and impelling means of the present invention.

Referring to FIG. 1, the glass batch is melted and refined in a tank 10 and flows from the tank through an outlet 11 in the wall 12 of the tank and beneath a skimmer block 13 into the forehearth 14. The glass 15 is further refined and its temperature and viscosity regulated by heating in a conventional manner as the glass flows through forehearth 14 to a feeder outlet 16. Forehearth 14 is comprised generally of a bottom 17, a roof 18 and upwardly-extending side walls 19 and 20.

The glass 15 which is conveyed through the lengthy forehearth 14 may be fully transparent and colorless or, alternately, the glass may be colored as by the introduction of a coloring material into the glass, both forms being utilized to produce glass block, jars, bottles, tumblers, etc. For purposes of describing the invention the making of a colored glass product is set forth hereinafter.

Coloring material 21 which may consist of various glass-forming oxides or other colorants is retained in a hopper 22. A motor-driven feeder (not shown) is utilized to feed and control the flow of colorant through one or more vertical tubes 23 extending through an opening in the roof 18 extending over the forehearth channel.

A submerged dam 25 is mounted in stationary relation within the forehearth channel extending between side walls 19 and 20 in generally vertical alignment with vertical tube 23 for delivering the coloring material. In one embodiment of the present invention it is preferred that a single delivery tube 23 be positioned in substantially vertical alignment with the downstream edge of dam 25 so that the colorant is carried into and dispersed within the molten glass as it flows downwardly on the downstream side of the dam. The material 21 is thereby delivered into the forehearth where it is distributed over the surface of the moving molten glass and is drawn downwardly by the flow pattern of the glass on the downstream side of the dam.

A plurality of burners 26 facing inwardly is disposed in the upright side walls of the forehearth to direct burner fires over the surface of the glass to control its conditioning. The burners extend essentially throughout the length of the forehearth to regulate and control the temperature and viscosity of the molten glass at exposed surface regions.

A stationary diverter member 27 is mounted within the forehearth channel spaced apart downstream from dam 25 extending substantially through the major portion of the channel width and upwardly at least above the level to which the molten glass normally extends. Diverter member 27 is attached to side wall 19 and forms a restricted passage 28 between its terminating end portion and channel side wall 20. A corner block 29 having a triangular cross-section is mounted on the downstream side of diverter element 27 and adjacent side wall 19 to eliminate accumulating and residing of the glass in a so-called "dead pocket" conducive to compositional and color changes.

In one embodiment of the present invention a pair of similar stirring devices each consisting of a series of three similar stirrers 30 is mounted between dam 25 and diverter 27 in spaced-apart relation at zones A and B with their axes disposed in a vertical plane essentially normal to the forehearth channel. Each of the stirrers 30 consists of an elongated implement having a cylindrical upper end portion which constitutes its shank. The shank portions of the stirrers are carried by a supporting arm 31 retained in rotatable relation and depending downwardly into the glass. The lower end portion of each stirrer has a screw thread 32 surrounding its cylindrical main body portion adapted to full submission within the normal level of the glass stream. The screw-threaded lower end portions 32 of the stirrers are of the same hand for effective and conjunctive coaction with one another in stirring and acting on the glass in the channel forehearth when the stirrers are rotated about their respective axes in the same direction by suitable driving means.

The cylindrical upper portion of each stirrer 30 is rotatable in suitable bearings with its axis extending vertically perpendicular to the direction of flow of the glass stream in the forehearth. Each stirrer is rotated continuously by a motor 35 which has driving connection with the upper end of each through speed reduction gearing and a driving chain 36 trained over a sprocket 37 keyed to the motor drive shaft.

It is preferred that one transverse series of three stirrers 30 be mounted in a parallel plane adjacent and immediately upstream of diverter element 27 in zone A. The screw threads 32 of the individual stirrers are arranged with their crowns in near rlation to each other as well as the upstream face of the diverter member. All of the stirrers are rotated conjunctively in the same direction such as clockwise as shown in FIG. 2 so that the spiral thread lower end portions impel the glass both circularly and upwardly between and around the series of stirrers. Severe shearing stresses are imparted to the glass flowing in its normal direction of travel between an adjacent pair of stirrers as well as between an individual stirrer 30 disposed nearest forehearth side wall 20 as shown in FIG. 2. The spacing between the latter is arranged to be minimal so that maximum shearing stresses are imparted to the glass passing therebetween in the direction of normal stream flow. Restricted opening 28 between diverter member 27 and channel side wall 20 is arranged to be adjacent and immediately downstream of the region of maximum shearing stresses imparted by the stirrer nearest the same side wall.

As will be observed in FIG. 2, the glass surrounding the series of three stirrers 30 disposed in zone A is given primary circulatory and upward motion thereby. The submerged portions of the stirring elements may have the configuration of vanes, screws or blades and are of sufficient dimensions and are arranged in aligned relation extending throughout a substantial portion of the channel width. The submerged screw-thread portions of the stirrers move in paths extending near each other and one forehearth side wall and the upstream face of the diverter element. The glass which is given primary circulatory and upward motion in zone A imparts secondary circulatory motion in the reverse direction to the glass immediately upstream thereof in zone C. As stated, the stirrers are disposed with their adjacent submerged extremities in sufficiently near relation to bottom 17 that the screw threads force bottom portions of the glass upwardly to near the surface of the glass. The stirrers are driven at such speed to cause a vigorous stirring and intermingling of the entire body of glass flowing through the forehearth in each localized region A and B of primary circulatory and upward movement. The stirrers are of such dimensions and rotated at such speed to prevent glass from passing between the maximum spacing between the stirrer located near side wall 19 in the normal direction of stream flow.

The transverse series of similar stirrers 30 are disposed at zone B in essentially the same arrangement as at zone A. This series of stirring elements is positioned in essentially the same relation and rotated in the same direction as in zone A. The stirrers at zone B also tend to impart primary circulatory and upward movement to the glass as at zone A except some of the glass flowing from the downstream side thereof passes into secondary circular movement in zone C in the reverse direction of stirrer rotation.

Damper or skimmer blocks 40 and 41 extend through roof 18 of the forehearth downwardly between the side walls thereof to a point just above the glass level to provide temperature control chambers 42, 43 and 44. Such construction facilitates the control of the temperature of the burner flames and the glass surface portions in each of the compartments without directly or adversely affecting the others. If necessary, the temperature in compartment 42 may be elevated as required sufficiently to ensure the expedient melting of the added colorant 17 and the temperature in the other downstream compartments 43 and 44 may be lowered to bring the temperature of the glass gradually down to the desired working temperature at outlet 16.

Each series of stirrers 30 is rotated at a speed conducive to rapidly accelerating the flow of glass therepast and therearound as severe shearing stresses are applied in zones A and B. The surface flow of glass in secondary circulatory movement in the reverse direction in zone C between the several banks of stirrers is retarded by skimmer block 40 disposed in a medial region. The colorant which is added is essentially completely melted prior to reaching the first bank of stirrers in zone B and considerable homogenizing of the molten glass stream in accomplished thereat. The combustion heating of surface portions of the glass stream and stirring bottom portions of the glass upwardly countercurrent to normal flow further ensures complete and rapid melting of the added coloring material in compartments 42 and 43. Complete homogenizing of the stream is obtained by its passage one or more times through zones A and C as described hereinabove.

The subject method and apparatus finds particular utility in the manufacture of glass products of appreciable size and at appreciable rates of furnace pull as high as 40 to 50 tons per day.

Various modifications may be restored to within the spirit and scope of the appended claims.

We claim:

1. Apparatus for homogenizing molten glass in a glass feeder forehearth or the like comprising, in combination, a flow channel having an essentially horizontal planar bottom and upright sidewalls for conveying a molten glass stream, a stationary diverter member disposed transversely within said channel extending from the bottom of said channel vertically at least to a level above the normal level of the molten glass stream and through the major portion of the width of said channel forming a narrow side opening, at least one series of vertically-disposed similar rotary stirring elements having screw threads on their lower end portions mounted in a parallel plane adjacent and immediately upstream of said diverter member, said stirring elements depending from above into said flow channel and extending through a major portion of said channel width with their lower ends adjacent to and spaced above said bottom and their screw thread portions submerged below the normal level of said glass stream, and means adapted to rotate said stirring elements in the same direction about their respective vertical axes.

2. The apparatus as defined by claim 1 wherein the screw threads on the lower end portions of said stirring elements are of the same hand, and the means for rotating the said stirring elements about their axes is operable to rotate them in the same direction so that the glass surrounding said elements is impelled upwardly and around said plurality of stirring elements in primary circulatory movement.

3. The apparatus as defined by claim 1 including a stationary submerged dam member disposed in spaced-apart relation upstream of said diverter member, and two transverse series of rotary stirring elements arranged in spaced relation between said dam and diverter members, each series adapted to impart primary circulatory and upward movement to said glass stream.

4. Glass stirring apparatus for homogenizing molten glass and additive coloring materials in a glass feeder forehearth comprising, in combination, a flow channel having an uniform horizontal bottom and upright uniform sidewalls for conveying a molten glass stream, means for introducing additive coloring materials into said stream, a stationary dam disposed in fully submerged relation transversely of said channel adjacent the said means for introducing additive coloring materials, a stationary diverter member disposed transversely within said channel spaced-apart downstream from said submerged dam, said diverter member extending from the bottom of said channel vertically at least to a level above the normal level of the molten glass stream and through the major portion of the width of said channel to form a restricted opening, at least two spaced-apart series of stirring implements disposed between said submerged dam and diverter member, each series comprising a plurality of vertically-disposed rotary stirring elements having screw threads on their lower end portions mounted in transverse array with their adjacent sides in near relation, at least one series of said stirring elements disposed adjacent and immediately upstream of said diverter member shifted toward said restricted opening adapted to impart severe shearing stresses to the glass stream flowing therethrough, said plurality of stirring elements depending from above into said flow channel with each series extending through a major portion of the channel width with their lower ends adjacent to and spaced above said bottom and their screw thread portions submerged below the normal level of said glass stream, said spaced-apart series of stirring implements being adapted to impart secondary circulatory motion to said stream, and means adapted to rotate each series of stirring elements in the same direction about their respective vertical axes.

References Cited by the Examiner

UNITED STATES PATENTS

| 2,467,809 | 4/1949 | Cannon et al. | 65—178 |
| 2,707,621 | 5/1955 | Peiler | 65—134 |
| 3,057,175 | 10/1962 | Rough et al. | 65—178 |

FOREIGN PATENTS

| 1,060,109 | 6/1959 | Germany. |

DONALL H. SYLVESTER, *Primary Examiner.*

ARTHUR P. KENT, *Examiner.*